United States Patent
Webb

(10) Patent No.: US 8,245,773 B2
(45) Date of Patent: Aug. 21, 2012

(54) CENTRALIZING DEVICE FOR AN ELONGATED BODY IN A MOUSE HOLE MACHINE

(75) Inventor: Jonathan Garrick Webb, Kristiansand (NO)

(73) Assignee: National Oilwell Norway AS (NO)

( * ) Notice: Subject to any disclaimer, the term of this patent is extended or adjusted under 35 U.S.C. 154(b) by 496 days.

(21) Appl. No.: 12/311,010

(22) PCT Filed: Aug. 24, 2007

(86) PCT No.: PCT/NO2007/000299
§ 371 (c)(1), (2), (4) Date: Jun. 24, 2009

(87) PCT Pub. No.: WO2008/035977
PCT Pub. Date: Mar. 27, 2008

(65) Prior Publication Data
US 2010/0206562 A1    Aug. 19, 2010

(30) Foreign Application Priority Data
Sep. 18, 2006  (NO) .................................... 20064208

(51) Int. Cl.
*E21B 19/14* (2006.01)
(52) U.S. Cl. ..................................... 166/85.5; 211/70.4
(58) Field of Classification Search .... 166/77.51–77.53, 166/85.1, 85.5, 241.3; 414/745.2, 22.63, 414/22.68, 22.69, 22.71; 211/70.4
See application file for complete search history.

(56) References Cited

U.S. PATENT DOCUMENTS

| 2,321,245 | A | * | 6/1943 | Reed | 166/77.51 |
| 2,999,549 | A | * | 9/1961 | Stratton | 175/5 |
| 3,371,728 | A | * | 3/1968 | Crooke et al. | 175/85 |
| 3,966,054 | A | * | 6/1976 | Kelly | 211/70.4 |
| 4,071,145 | A | * | 1/1978 | Guinn et al. | 211/70.4 |
| 4,505,614 | A | | 3/1985 | Anschutz | 405/195.1 |
| 5,468,121 | A | | 11/1995 | Stogner | 414/745.2 |
| 5,595,248 | A | | 1/1997 | Denny | 166/379 |
| 6,394,186 | B1 | * | 5/2002 | Whitelaw et al. | 166/349 |
| 7,111,676 | B2 | | 9/2006 | Drzewiecki | 166/85.5 |
| 7,143,848 | B2 | | 12/2006 | Armell | 175/325.1 |
| 8,052,370 | B2 | * | 11/2011 | Dekker et al. | 414/22.66 |
| 2002/0023749 | A1 | * | 2/2002 | Kirk et al. | 166/241.1 |
| 2006/0108113 | A1 | * | 5/2006 | Scott et al. | 166/255.1 |

* cited by examiner

*Primary Examiner* — Daniel P Stephenson
*Assistant Examiner* — Blake Michener
(74) *Attorney, Agent, or Firm* — Conley Rose, P.C.

(57) ABSTRACT

Disclosed is a device for centralizing an elongated body, such as a pipe, in the opening of a mousehole machine along the machine's center axis. The device includes two centralizing bows supported within the opening and adapted for rotation about a common, mainly horizontal axis of rotation that extends across the opening of the mousehole machine, the bows being located on radially-opposite sides of the axis of rotation. Upon rotation of the bows, the pipe is moved by contact with a first of the bows toward the center axis until the second of the bows contacts the pipe.

26 Claims, 4 Drawing Sheets

III-III

CENTRALIZING DEVICE FOR AN ELONGATED BODY IN A MOUSE HOLE MACHINE

BACKGROUND OF THE INVENTION

1. Field of the Invention

This invention relates to a centralizing device for an elongated body in a mousehole machine. More particularly, it relates to a centralizing device which is arranged in a mousehole machine to centre an elongated body which is in the mousehole machine, the centralizing device being at the upper portion of the mousehole machine. The centralizing device is supported and rotatable on a mainly horizontal axis of rotation extending through the opening of the mousehole machine, the centralizing device comprising centralizing bows located on opposite sides of the axis of rotation.

2. Description of Related Art

All indications of direction, such as horizontal and vertical, refer to the equipment arranged in the working position. The work of building a pipe string from pipes and running the pipe string into a borehole or a well and the work of pulling a pipe string out of a borehole or a well and breaking out the pipes of the pipe string are mainly carried out from a drill floor. At their end portions the pipes are provided with threads, and the pipes are connected and disconnected by screwing. Screwing operations are performed by means of motor-driven tools.

The work process is made more efficient by moving some screwing operations and handling of single pipes out of the central area on the drill floor, that is, away from the centre of the borehole or well.

This is achieved by first joining, outside the central assembly area, a few pipes, for example three or four pipes, into a pipe string section which, in turn, is carried to the central assembly area to be included in the pipe string, possibly via an intermediate storage. Correspondingly, a pipe string is disassembled by first being divided into pipe string sections, each consisting of several pipes. Each pipe string section is carried away from the central assembly area for further disassembling. The screwing operations are thereby divided between two assembly areas on the drill floor, a central assembly area near the centre of the borehole or well, and a non-central assembly area.

It is common to place pipes and pipe string sections in a so-called mousehole, here called a mousehole machine, in the drill floor in connection with screwing operations taking place outside the central area.

A mousehole machine comprises a substantially vertical, tubular sleeve which is open at its upper end and which is provided with a pipe support below the upper end portion of the sleeve, for example in the form of a possibly movable end plate-/bottom plate at the lower end portion of the sleeve. The mousehole machine is installed below the drill floor and concentrically to an opening, a hole, in the drill floor. The depth of the mousehole machine is determined by the location of the pipe support.

During make-up and break-out of the pipes it is important that the pipe which is in the mousehole machine is centred in the mousehole machine to engage in the mechanized pipe tongs used. The prior art includes the use of leaf springs which are installed in the mousehole machine to centre the pipe. Further it is known to use elastic packers or bushings of adapted dimensions. It is also known to use hydraulic or mechanical centralizing devices, typically including three plates distributed around the central axis of the mousehole machine, which are arranged to be moved radially towards the central axis to centre the pipe.

Prior art devices are either complicated, and thereby relatively costly to buy and operate, inaccurate or cumbersome in use.

SUMMARY OF THE PRESENT INVENTION

The invention has as its object to remedy or reduce at least one of the drawbacks of the prior art.

The object is achieved in accordance with the invention through the features that are specified in the description below and in the claims that follow.

A centralizing device in accordance with the invention for an elongated body which is in the mousehole machine, the centralizing device being located at the upper portion of the mousehole machine, is characterized by being supported and rotatable around a substantially horizontal axis of rotation extending through the opening of the mousehole machine, and by the centralizing device including two centralizing bows located on radially opposite sides of the axis of rotation.

The centralizing device is rotatable, typically by means of an actuator, around the axis of rotation between a first inactive position, in which the centralizing bows are at the sleeve wall of the mousehole machine, and an active position, in which the centralizing bows have been rotated in such a way that they bear on an elongated object extending between the centralizing bows.

The object which may be a pipe or other equipment connected with a pipe, can thereby be held clamped and centred in the mousehole machine. The torque applied from the centralizing device to the pipe is absorbed by the pipe as the pipe is placed by its lower end portion in a normally vertically movable pipe support (rabbit) located at a lower height level in the mousehole machine. If a pipe support of this kind is not present, the torque of the pipe can be absorbed by, for example, a further centralizing device located at a vertical distance from the first centralizing device.

It is advantageous that at least one centralizing bow is provided with a guide notch which is arranged to guide the pipe in towards the centre axis of the mousehole machine in a direction along the axis of rotation.

The best guiding of the pipe is achieved if the centralizing bows on axially opposite sides are provided with a guide notch each. Together, the centralizing bows can form a ring which is made of a plastic material, for example.

A centralizing device in accordance with the invention is, compared to prior art centralizing devices, relatively compact and not very space-demanding. This feature contributes to the pipe support being movable into a position near the drill floor, which is of importance for some work operations. However, the main advantage of the centralizing device is that, without readjustment, it can centre all pipes and other equipment of different diameters which, according to normal practice, are placed in the mousehole machine.

BRIEF DESCRIPTION OF THE SEVERAL VIEWS OF THE DRAWINGS

In what follows, there is described a non-limiting example of a preferred embodiment which is visualized in the accompanying drawings, in which.

DETAILED DESCRIPTION OF THE INVENTION

Figure 1:
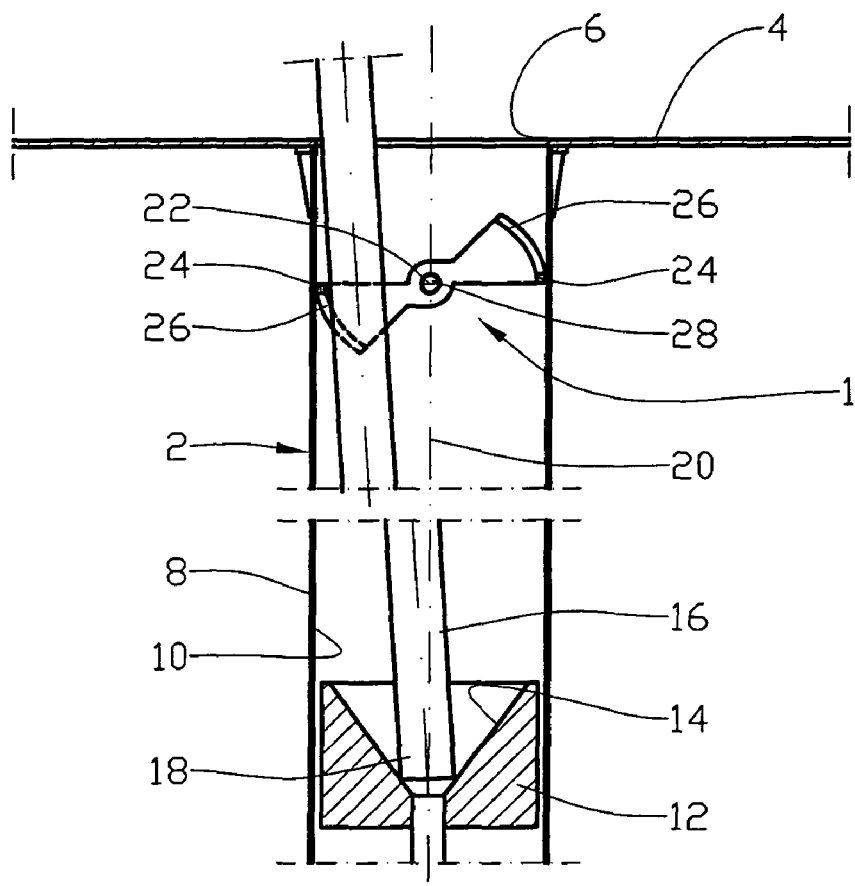
FIG. 1 shows a principle drawing of a mousehole machine which is provided with a centralizing device according to the invention, a pipe being placed in the mousehole machine.

In the drawings the reference numeral 1 denotes a centralizing device which is placed in the upper portion of a mousehole machine 2, the mousehole machine 2 being located beneath a drill floor 4 concentrically to a drill floor opening 6. The mousehole machine 2 comprises a vertical tubular sleeve 8 with an internal opening 10, in which there is arranged a vertically movable pipe support 12.

On its side facing the centralizing device 1, the pipe support 12, which is hydraulically operated, is provided with a conical recess 14 which causes the lower end portion 18 of an elongated body 16, for example in the form of a pipe, which is placed in the pipe support 12, to be centred relative to the centre axis 20 of the mousehole machine 2.

Figure 3:
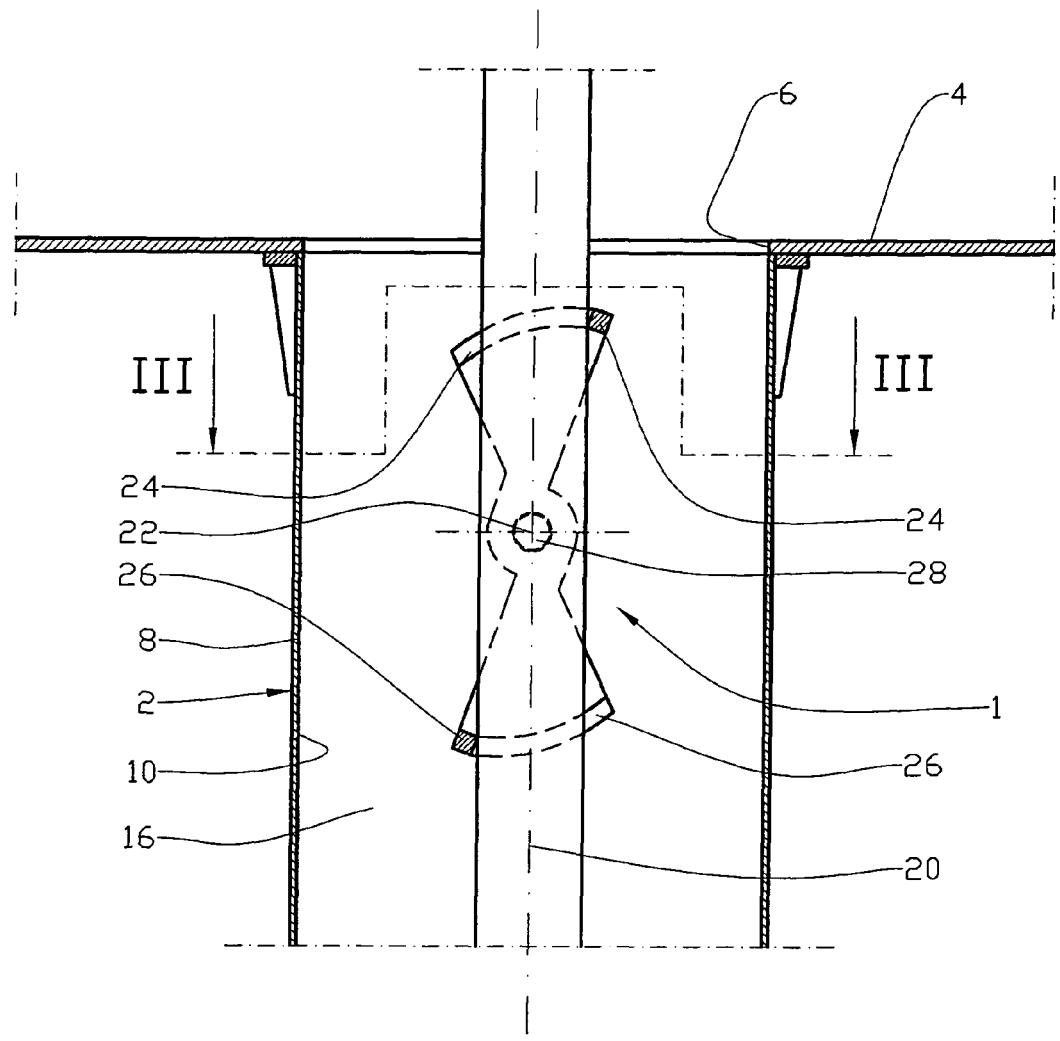
FIG. 3 shows the same as FIG. 2, but after the pipe has been centred.

The centralizing device 1 comprises two opposite directed, concave centralizing bows 24 located on opposite sides of an axis of rotation 22. On axially opposite sides the centralizing bows 24 are each provided with a guide notch 26, the centralizing bows 24 in this preferred exemplary embodiment having been given an annular shape. The guide notch 26 is formed as a V-shaped recess which is arranged to move, when rotated in towards the pipe 16, the pipe 16 towards the centre axis 20 of the mousehole machine 2, see FIGS. 3 and 5.

Figure 4:
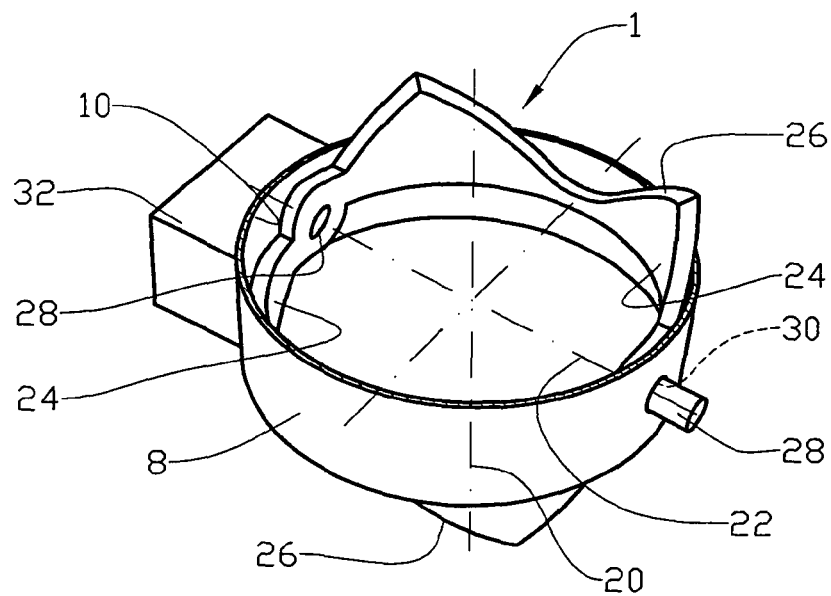
FIG. 4 shows the centralizing device in perspective.

The axis of rotation 22 extends horizontally through the centre axis 20, two stub axles 28 which are concentric to the axis of rotation 22 being supported and extending through corresponding through openings 30 in the tubular sleeve 8, see FIG. 4.

Figure 5:
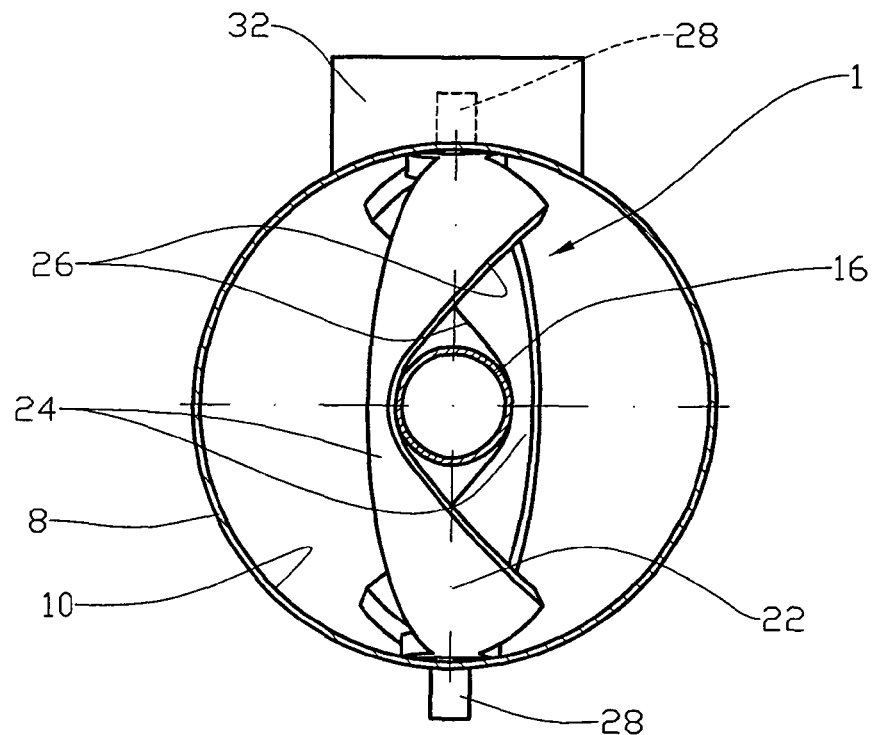
FIG. 5 shows a section III-III of FIG. 3.

One of the stub axles 28 is connected to an actuator 32, see FIGS. 4 and 5.

Figure 2:
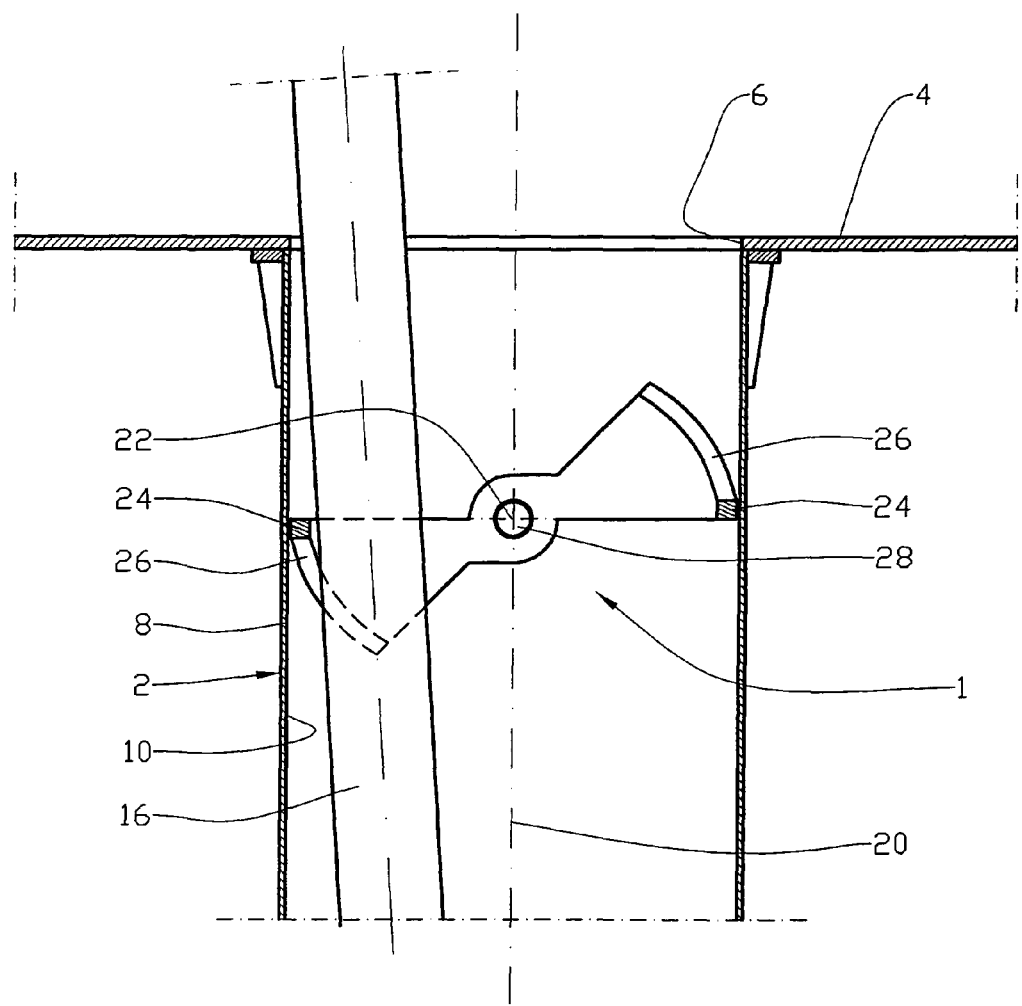
FIG. 2 shows, on a larger scale, a section of FIG. 1.

When the centralizing device 1 is in its inactive position, see FIGS. 1, 2 and 4, the centralizing bows 24 have been rotated to a position, in which they are disposed along the internal opening 10 of the tubular sleeve 8. In this position the centralizing device 1 is not obstructive to the insertion of a pipe 16 into the mousehole machine, as the radial distance between the centralizing bows 24 mainly coincides with the diameter of the drill floor opening 6.

When a pipe 16 which is in the mousehole machine 2 is to be centred, the centralizing device 1 is rotated around the axis of rotation 22 by means of the actuator 32 until one of the centralizing bows 24 contacts the pipe 16. The pipe 16 is centred in the mousehole machine 2 by the pipe 16 being moved, during the further rotation of the centralizing device 1, towards the centre axis 20 until the second centralizing bow 24, which is on the opposite side of the pipe 16, hits the pipe 16, see FIG. 3.

The pipe 16 is also centred by the guide notches 26 in the direction along the axis of rotation 22, see FIG. 5.

The invention claimed is:

1. A centralizing device for centralizing an elongated body in the opening of the upper portion of a mousehole machine along the machine's center axis, comprising,
    two centralizing bows supported within the opening and adapted for rotation about a common, mainly horizontal axis of rotation that extends across the opening of the mousehole machine, said bows located on radially-opposite sides of the axis of rotation.

2. The centralizing device in accordance with claim 1, characterized in that at least one of the centralizing bows is provided with a guide notch.

3. The centralizing device in accordance with claim 1, characterized in that the centralizing bows are each provided with a guide notch.

4. The centralizing device in accordance with claim 1, characterized in that, together, the centralizing bows form a ring.

5. The centralizing device in accordance with claim 1, further comprising an actuator; and
    wherein the bows are adapted to be rotated by the actuator around the common, mainly horizontal axis of rotation between a first inactive position in which the centralizing bows are adjacent to a wall of the sleeve in the mousehole machine, and an active position in which the centralizing bows bear on an elongated object extending between the centralizing bows.

6. A device for centralizing an object within a sleeve generally along a center axis of the sleeve, the sleeve having a sleeve wall, the sleeve wall defining an interior of the sleeve, the device comprising:
    a first body adapted for rotation within the interior of the sleeve,
    the first body having a first centralizing member connected to a second centralizing member, the first centralizing member disposed opposite the second centralizing member,
    the first and second centralizing members adapted for rotation about a first common axis of rotation that extends through the sleeve to move the centralizing members into contact with an object within the sleeve and, following said contact, to centralize the object within the sleeve.

7. The device of claim 6 wherein the first centralizing member comprises a concave centralizing bow with a first guide notch for guiding the object in toward the center axis of the sleeve.

8. The device of claim 7 wherein the second centralizing member comprises a concave centralizing bow with a second guide notch for guiding the object in toward the center axis of the sleeve.

9. The device of claim 8 wherein the guide notches are V-shaped recesses positionable to move, upon rotation of the first body, in towards the object.

10. The device of claim 6 wherein the first body is connected to two opposed axles, each axle positionable in a corresponding hole in the sleeve and concentric to the common axis of rotation, and wherein the first body is rotatable on the axles.

11. The device of claim 10 further comprising:
    an actuator connected to at least one of the two opposed axles and adapted to rotate the first body to move the centralizing members to contact the object.

12. The device of claim 6 further comprising:
    a second body rotatably-mounted within the interior of the sleeve and located below and spaced-apart from the first body,
    the second body having third and fourth centralizing members rotatable about a second common axis of rotation that extends through the sleeve,
    the third centralizing member positionable in the sleeve opposite the fourth centralizing member.

13. The device of claim 6 wherein the first body is in the form of a ring.

14. The device of claim 6 wherein the first common axis of rotation generally intersects the center axis of the sleeve.

15. The device of claim 6 further comprising:
a support below the first body for supporting the object, the support including a conical surface engaging the end of the object.

16. A method for centralizing an object within a sleeve, the sleeve having a sleeve wall defining an interior of the sleeve, the method comprising:
inserting an object into the sleeve and through the body of a centralizing device the centralizing device body having a first centralizing member and a second centralizing member adapted to rotate about a common axis of rotation, the first centralizing member opposite the second centralizing member, the body rotatably mountable to and within the sleeve for rotation to move the centralizing members into contact with the object and, following said contact, to centralize the object within the sleeve, and
rotating the first and second centralizing members about the common axis of rotation.

17. The method of claim 16 wherein the sleeve has a center axis and the device further comprises the first centralizing member comprising a concave centralizing bow with a first guide notch for guiding the object in toward the center axis of the sleeve, the second centralizing member comprising a concave centralizing bow with a second guide notch for guiding the object in toward the center axis of the sleeve, the method further comprising simultaneously rotating the first and second centralizing members.

18. The method of claim 16 wherein the body is connected to two opposed axles, each axle positioned in a corresponding hole in the sleeve, the body rotatable on the axles, and an actuator is connected to at least one of the two opposed axles and adapted to rotate the body to move the centralizing members to contact the object, the method further comprising
applying rotational force to an axel via the actuator.

19. The method of claim 16 wherein there is a torque-absorbing device in the sleeve below the body of the centralizing device, the method further comprising absorbing with the torque-absorbing device the torque that is applied to the object by the centralizing device.

20. A mousehole machine, comprising:
a tubular sleeve having a center axis and an opening adjacent to an upper end of the sleeve,
a pair of centralizing members supported within the opening and adapted for simultaneous rotation about a first common axis of rotation, said common axis of rotation being generally horizontal and extending through said sleeve, and
a torque-absorbing member supported within said tubular sleeve at a position below said centralizing members.

21. The mousehole machine of claim 20, wherein said centralizing members are rotatable about said first common axis of rotation between an inactive position in which the centralizing members are positioned adjacent to the wall of the sleeve, and an active position in which the centralizing members are angularly-spaced from the wall and closer to the center axis of the sleeve as compared to the inactive position.

22. The mousehole machine of claim 20, wherein said torque-absorbing member comprises a second pair of centralizing members supported within the sleeve and adapted for rotation about a second common axis of rotation spaced apart from the first common axis of rotation.

23. The mousehole machine of claim 20 wherein said centralizing members are connected to form an annular centralizing body.

24. The mousehole machine of claim 23 wherein each of said centralizing members comprises a bow-shaped portion.

25. The mousehole machine of claim 24 wherein at least one bow-shaped portion comprises an object-engaging surface for engaging an object that is disposed in said sleeve and a notch formed on said object-engaging surface.

26. The mousehole machine of claim 20 wherein said centralizing members are positioned in said sleeve such that said first common axis of rotation passes generally through said center axis of said sleeve.

\* \* \* \* \*